(12) United States Patent
Scott

(10) Patent No.: US 9,061,644 B2
(45) Date of Patent: Jun. 23, 2015

(54) GUSSET FOR A ROLL-OVER PROTECTION SYSTEM OF A WORK VEHICLE

(71) Applicant: CNH America, LLC, New Holland, PA (US)

(72) Inventor: Shane M. Scott, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 81 days.

(21) Appl. No.: 13/871,138

(22) Filed: Apr. 26, 2013

(65) Prior Publication Data

US 2014/0319875 A1     Oct. 30, 2014

(51) Int. Cl.
| | |
|---|---|
| *B60R 21/13* | (2006.01) |
| *B62D 27/02* | (2006.01) |
| *B60R 21/00* | (2006.01) |
| *B62D 33/06* | (2006.01) |

(52) U.S. Cl.
CPC ............... *B60R 21/13* (2013.01); *B62D 27/02* (2013.01); *B60R 2021/0081* (2013.01); *B60R 2021/137* (2013.01); *B60R 21/131* (2013.01); *B62D 33/0617* (2013.01)

(58) Field of Classification Search
CPC .... B60R 21/13; B60R 21/131; B62D 27/023; B62D 33/06; B62D 33/077; B62D 33/0617
USPC .............. 296/29, 30, 190.01, 190.03, 193.06, 296/205; 280/756; 180/89.12; 403/231
See application file for complete search history.

(56) References Cited

U.S. PATENT DOCUMENTS

| | | | |
|---|---|---|---|
| 3,022,106 A * | 2/1962 | Black | 296/29 |
| 3,632,134 A * | 1/1972 | Babbitt et al. | 280/756 |
| 3,785,696 A * | 1/1974 | Moore et al. | 296/102 |
| 4,135,756 A | 1/1979 | Hausmann | |
| 4,136,985 A | 1/1979 | Taul | |
| 5,529,342 A | 6/1996 | Mast et al. | |
| 5,630,622 A | 5/1997 | Kirschenmann et al. | |
| 5,636,867 A | 6/1997 | McNabb et al. | |
| 6,032,980 A | 3/2000 | Rapp et al. | |
| 7,427,097 B2 * | 9/2008 | Yoon | 296/190.03 |
| 7,712,824 B2 * | 5/2010 | Mori | 296/190.03 |
| 8,177,290 B2 | 5/2012 | Kamimae | |
| 2010/0187800 A1 * | 7/2010 | Chen et al. | 280/785 |
| 2012/0038186 A1 * | 2/2012 | Takaoka et al. | 296/190.03 |
| 2012/0231200 A1 * | 9/2012 | Seto et al. | 428/53 |

OTHER PUBLICATIONS

Co-pending U.S. Patent Application filed Dec. 20, 2012, bearing U.S. Appl. No. 61/740,123.

* cited by examiner

*Primary Examiner* — Jason S Daniels

(74) *Attorney, Agent, or Firm* — Sue C. Watson

(57) ABSTRACT

A gusset for use with a roll-over protection system of work a vehicle is disclosed. The gusset may include a first sidewall, a second sidewall spaced apart from the first sidewall and an outer face extending between the first and second sidewalls. The outer face may at least partially define an opening. The opening may be configured such that at least one of the first sidewall or the second side wall deforms relative to the outer face when the work vehicle experiences a roll-over event.

19 Claims, 7 Drawing Sheets

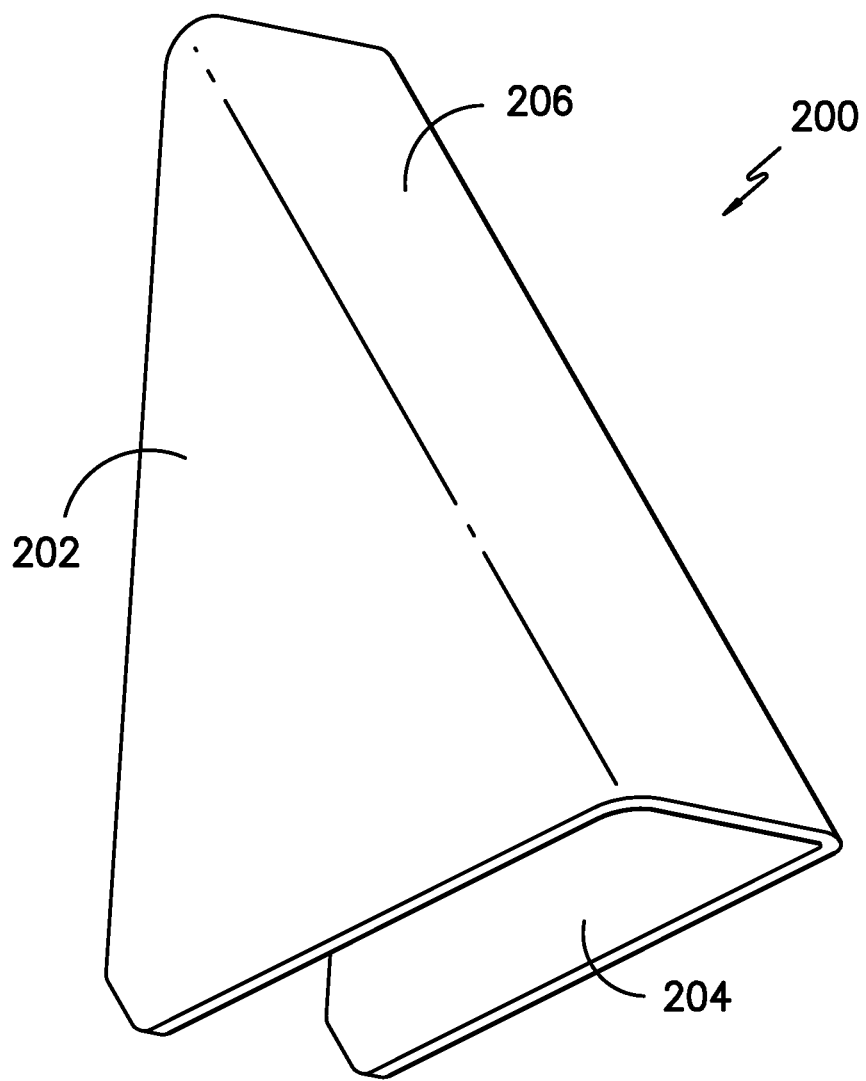
FIG. -1-
PRIOR ART

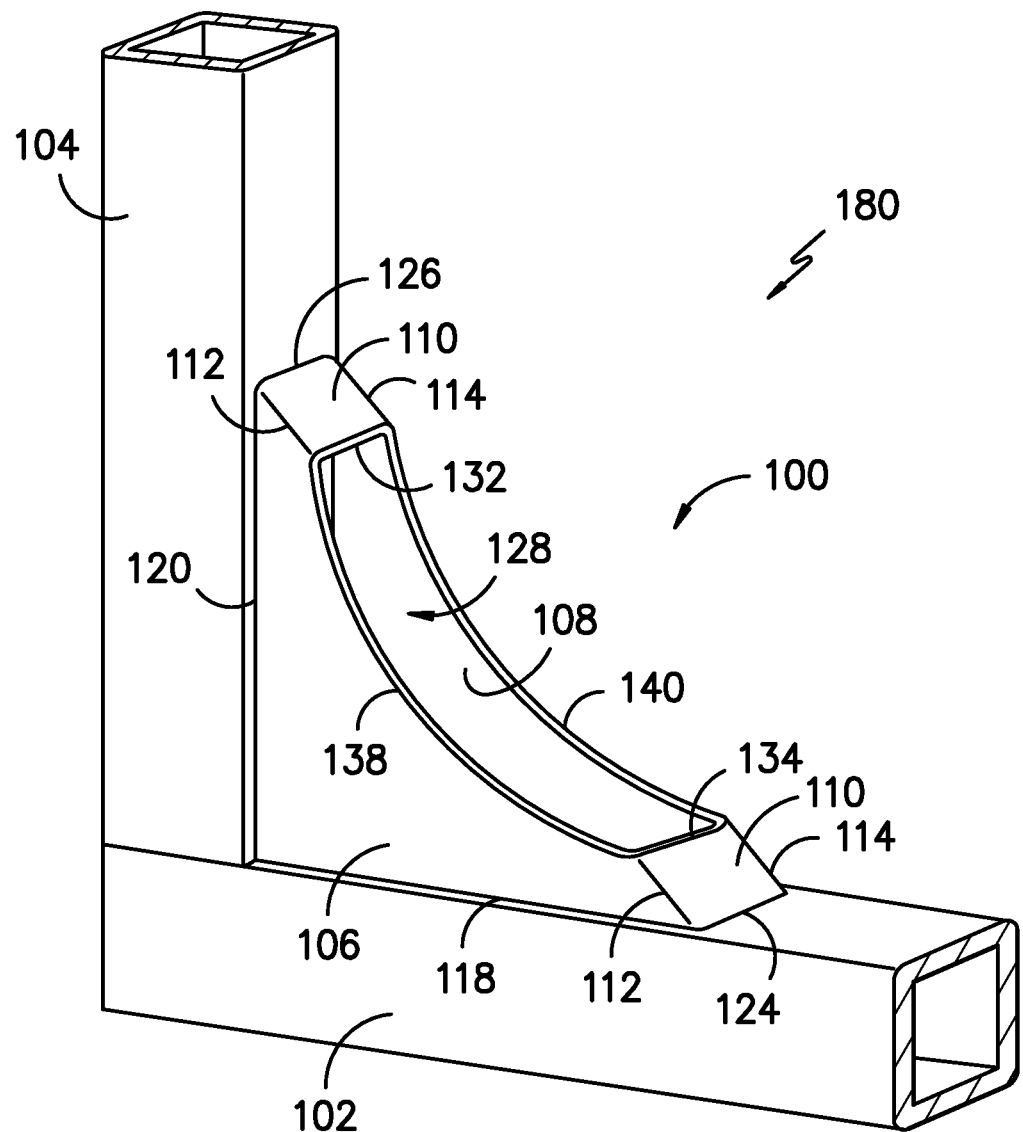
FIG. -2-

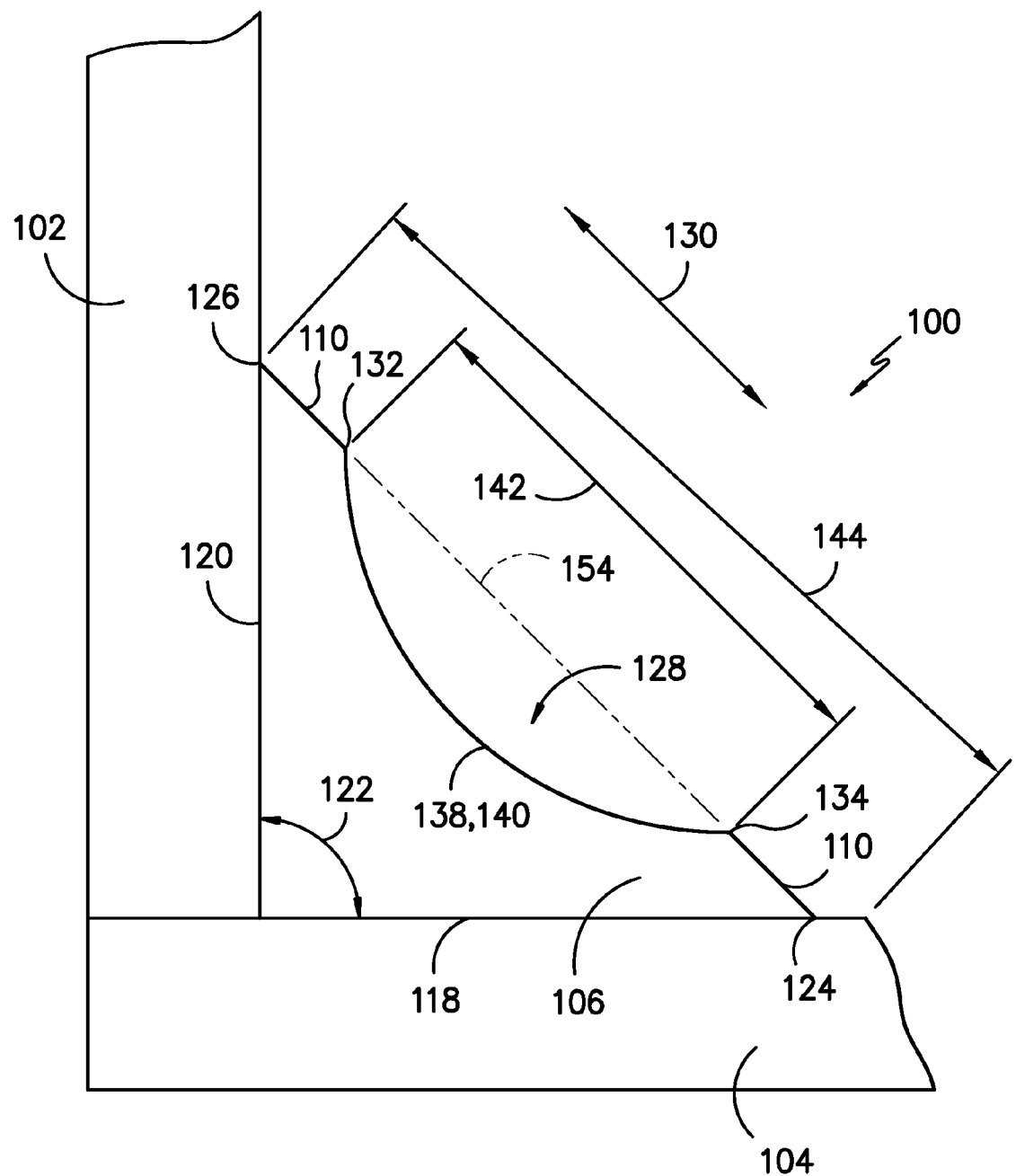
FIG. -3-

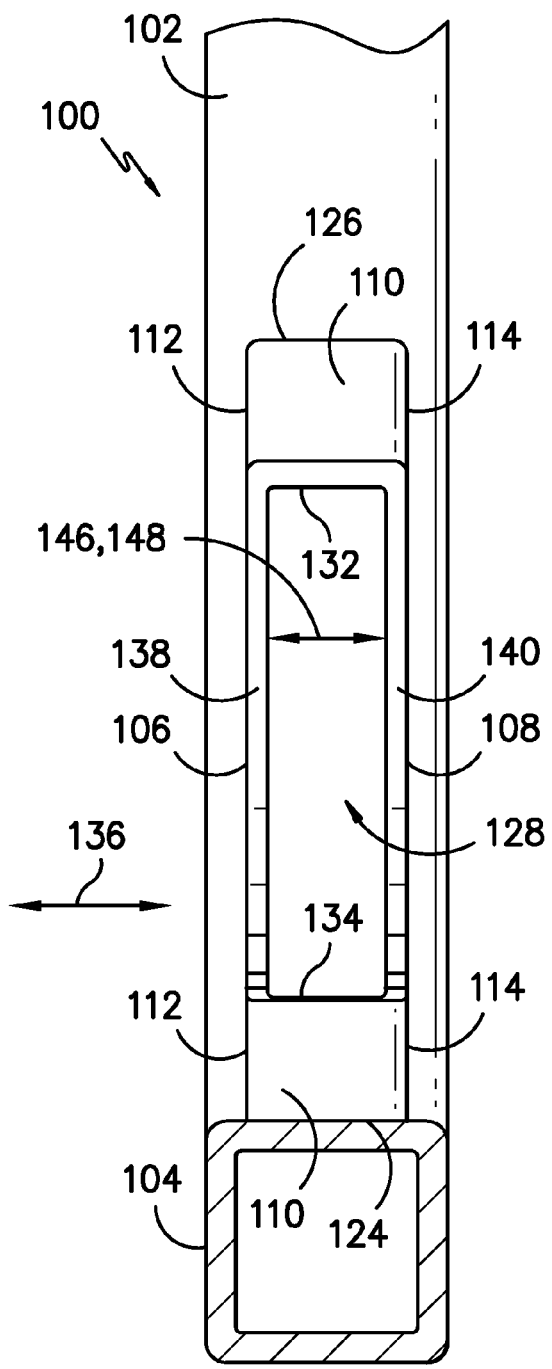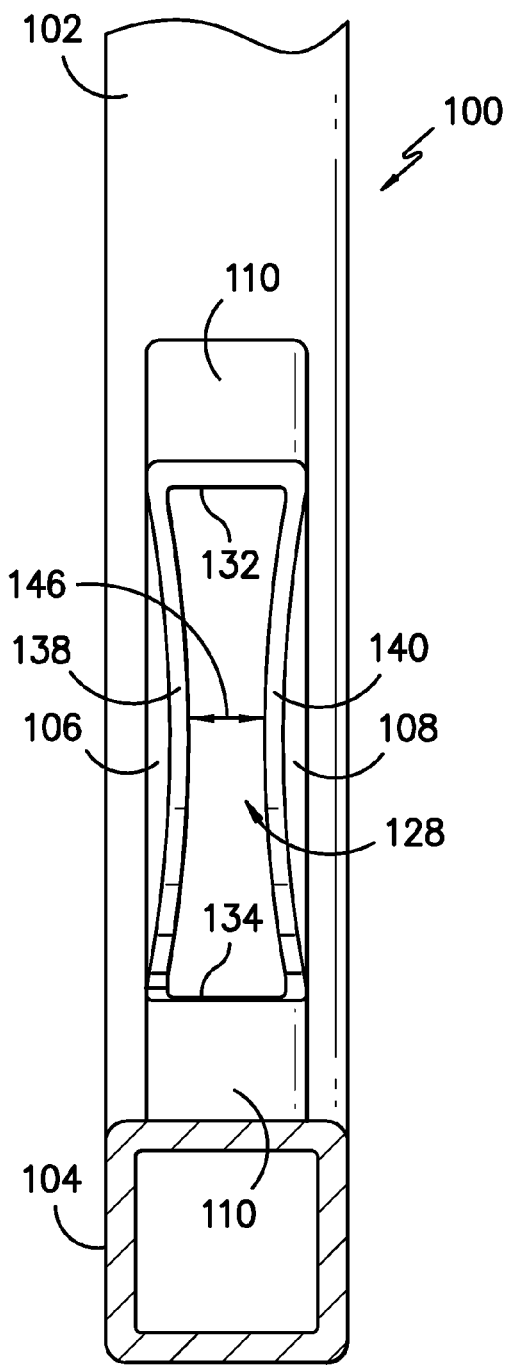

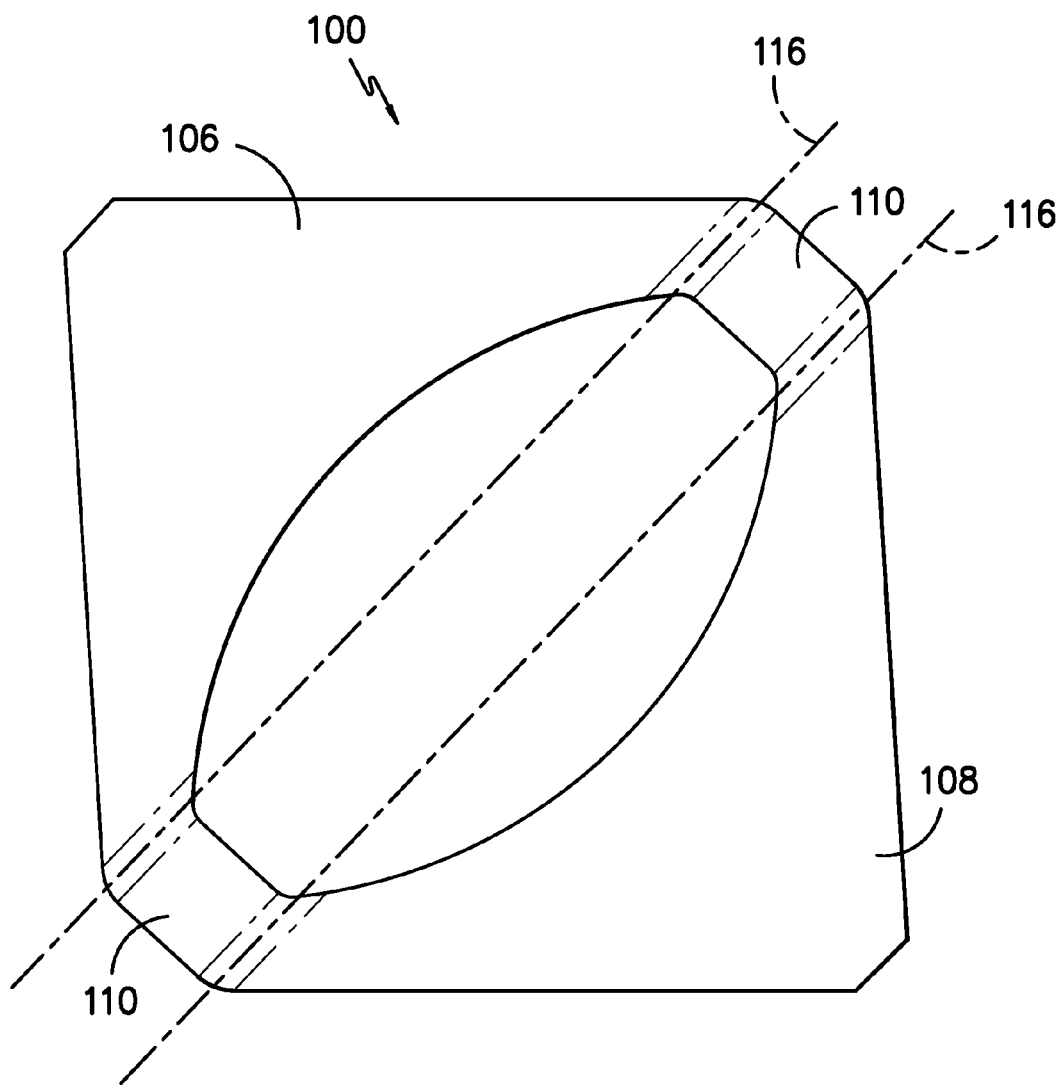
FIG. -6-

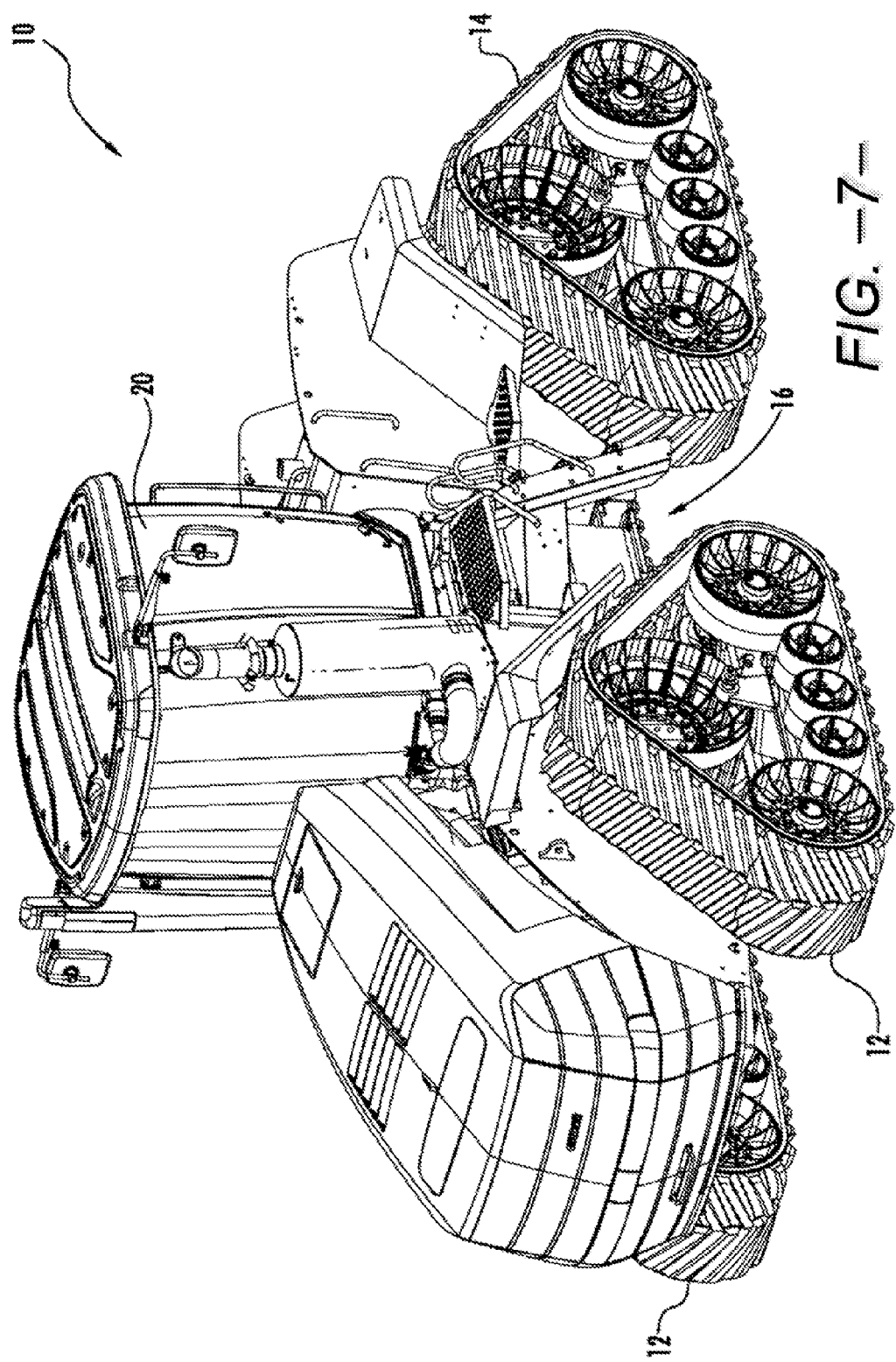
FIG. -7-

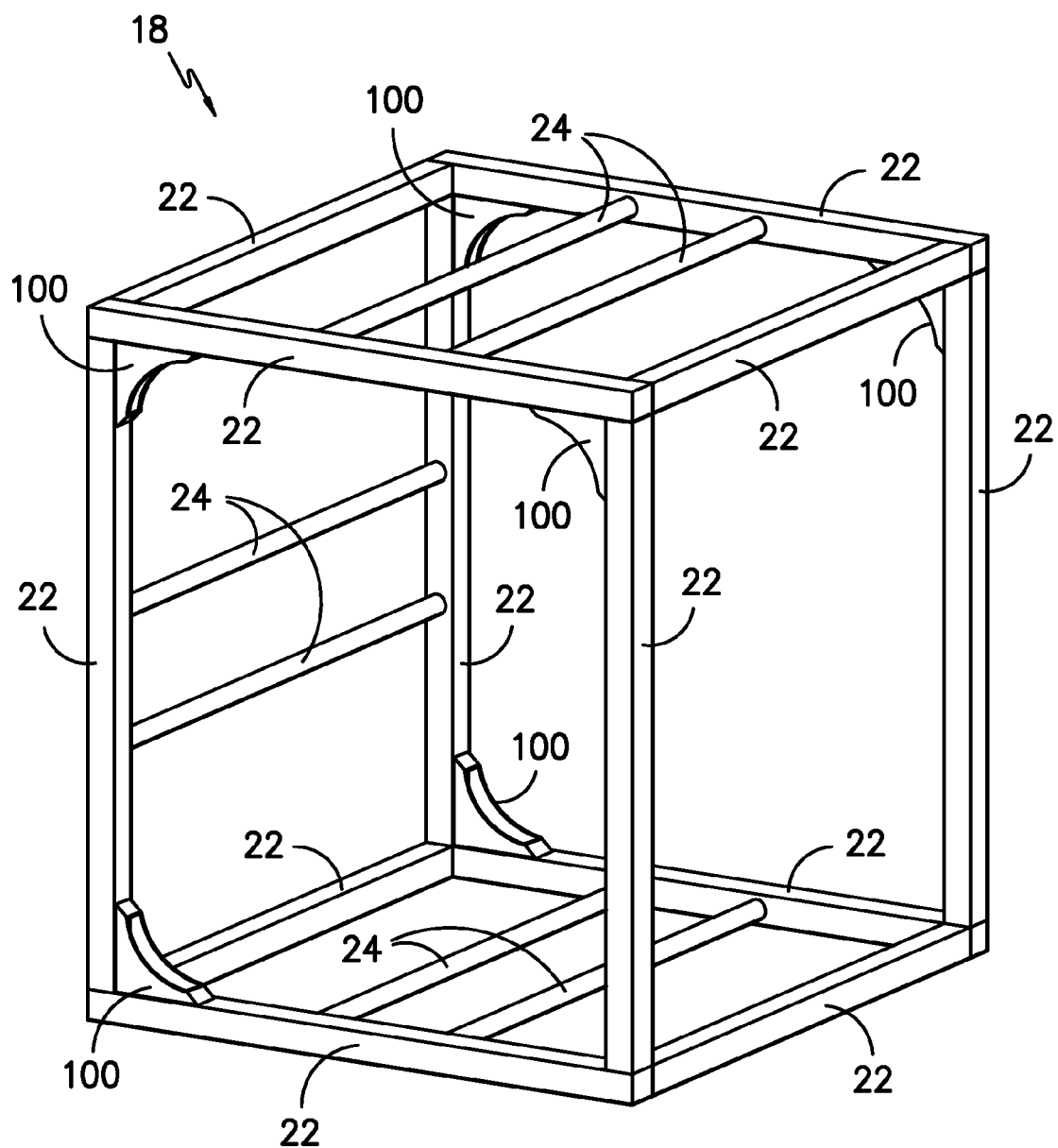
FIG. -8-

# GUSSET FOR A ROLL-OVER PROTECTION SYSTEM OF A WORK VEHICLE

FIELD OF THE INVENTION

The present subject matter relates generally to work vehicles and, more particularly, to an improved gusset configured for use with a roll-over protection system of a work vehicle.

BACKGROUND OF THE INVENTION

A wide range of off-highway, work vehicles have been developed for various purposes. In smaller work vehicles, seats and other operator supports may be sufficient, and these may be mounted on various forms of springs and other suspension components. However, in larger or more complex works vehicles, such as certain agricultural tractors and construction equipment, a partially or fully enclosed cab is more desirable, providing one or more operators with a comfortable location from which the vehicle may be operated. Such cabs, sometimes referred to as "operator environments" also provide a central location to which controls and operator interfaces may be fed, and from which most or all of the vehicle functions may be easily controlled.

Agricultural tractors and other large work vehicles are often required to provide some type of roll-over protection system (ROPS) to protect the operator in the event of a roll-over. Typically, a work vehicle with ROPS includes a cab frame coupled to the vehicle chassis via a suspension system. The suspension system is generally designed to provide for some limited movement of the cab frame relative to the chassis while still providing a suitable load transfer path between the cab frame and the chassis to accommodate roll-over loads. In addition, the cab frame, itself, typically includes a plurality of structural members coupled to one another to form a relatively stiff structural frame, with suitable gussets being coupled between one or more pairs of adjacent structural members to provide further stiffness and rigidity to the cab frame.

For example, FIG. 1 illustrates a perspective view of a conventional gusset 200 that is often used to stiffen the cab frame of a work vehicle. As shown, the gusset 200 includes a first sidewall 202, a second sidewall 204 and an outer face 206 extending between the first and second sidewalls 202, 204. The outer face 206 generally serves as a means for connecting the sidewalls 202, 204 and also serves to prevent such sidewalls 202, 204 from deforming relative to one another as loads are transmitted through the gusset 200.

Such conventional gussets 200 and other similar gussets (e.g., triangular plate gussets) typically provide consistent, high stiffness at all loading conditions. As a result, current gussets are well equipped to stiffen the structure of a cab frame as well as to reduce stress at the weld joints defined between the gussets and adjacent structural members of the cab frame. However, due to their high stiffness and rigidity, such gussets typically do not deform or otherwise absorb a significant amount of energy at increased loading conditions. Accordingly, other structural components of the cab frame and/or other ROPS components are typically required to deform significantly in order to absorb the increased energy resulting from a roll-over event, which is often undesirable Accordingly, an improved gusset for a ROPS frame or any other suitable structural frame that is capable of deforming and, thus, absorbing energy, at increased loading conditions would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a gusset for use with a roll-over protection system of work a vehicle. The gusset may include a first sidewall, a second sidewall spaced apart from the first sidewall and an outer face extending between the first and second sidewalls. The outer face may at least partially define an opening. The opening may be configured such that at least one of the first sidewall or the second side wall deforms relative to the outer face when the work vehicle experiences a roll-over event.

In another aspect, the present subject matter is directed to a structural frame for a work vehicle. The frame may generally include a plurality of structural members coupled together to form the frame. For example, the frame may include a first structural member and a second structural member coupled to the first structural member such that a corner is defined between the first and second structural members. In addition, the frame may include a gusset coupled between the first and second structural members at the corner. The gusset may include a first sidewall having a first edge and a second edge and a second sidewall spaced apart from the first sidewall. The second sidewall may also have a first edge and a second edge. The first edge of both of the first and second sidewalls may be configured to extend adjacent to the first structural member while the second edge of both of the first and second sidewalls may be configured to extend adjacent to the second structural member. The gusset may also include an outer face extending between the first and second sidewalls. The outer face may at least partially define an opening. The opening may be configured such that at least one of the first sidewall or the second side wall deforms relative to the outer face when the work vehicle experiences a roll-over event.

In a further aspect, the present subject matter is directed to a corner assembly for a structural frame. The corner assembly may include a first structural member and a second structural member coupled to the first structural member such that a corner is defined between the first and second structural members. In addition, the corner assembly may include a gusset coupled between the first and second structural members at the corner. The gusset may include a first sidewall, a second sidewall spaced apart from the first sidewall and an outer face extending between the first and second sidewalls. Moreover, an opening may be at least partially defined in the outer face.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a conventional gusset;

FIG. 2 illustrates a perspective view of one embodiment of a gusset in accordance with aspects of the present subject matter, particularly illustrating the gusset installed at a corner defined between adjacent structural members;

FIG. 3 illustrates a side view of the gusset shown in FIG. 2;

FIG. 4 illustrates a front view of the gusset shown in FIG. 2;

FIG. 5 illustrates another front view of the gusset shown in FIG. 2, particularly illustrating the gusset after its sidewalls have deformed in response to a roll-over event;

FIG. 6 illustrates a top view of a flat sheet or plate that may be used to form the gusset shown in FIG. 2;

FIG. 7 illustrates a perspective view of one embodiment of a work vehicle;

FIG. 8 illustrates a perspective view of one embodiment of a cab frame suitable for use with the work vehicle shown in FIG. 7, particularly illustrating the disclosed gussets installed at several corners of the cab frame.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a gusset for use within a structural frame. Specifically, in several embodiments, the gusset may be configured for use as a structural component within a cab frame or any other suitable ROPS frame/structure. The gusset may generally include a first sidewall, a separate second sidewall and an upper face extending between the first and second sidewalls. In addition, an opening may be defined at least partially within the upper face of the gusset. As will be described below, by configuring the disclosed gusset to include such opening, the sidewalls of the gusset may be capable of deforming at increased loading conditions, thereby allowing the gusset to absorb a significant amount of energy. However, at lower loading conditions, the gusset may provide stiffness and rigidity similar to that provided by conventional gussets (e.g., the gusset 200 shown in FIG. 1).

In several embodiments, the disclosed gusset will be described with reference to its performance during a roll-over event for a work vehicle. As is generally understood, due to the significant weight of work vehicles, roll-over events typically result in large loads being transmitted through the vehicle's cab frame, chassis and/or other structural components. For instance, when a work vehicle rolls over in a manner the causes the operator's cab to contact the ground, a reactive load (generally proportional to the weight of the vehicle and the angle of the vehicle relative to the ground) is typically applied through the vehicle's cab frame. In accordance with aspects of the present subject matter, the disclosed gusset may be configured to absorb a portion of the energy resulting from this reactive load, thereby reducing the amount of energy that must be absorbed by other structural components of the work vehicle.

Referring now to drawings, FIGS. 2-4 illustrate several views of one embodiment of a stiffening gusset 100 in accordance with aspects of the present subject matter. Specifically, FIG. 2 illustrates a perspective view of the gusset 100 installed at a corner defined between adjacent structural members (e.g., a first structural member 102 and a second structural member 104). Additionally, FIGS. 4 and 5 illustrate respective side and front views of the gusset 200 shown in FIG. 3.

In general, the gusset 200 may be configured as a triangular "U-shaped" structural component and, thus, may include a first sidewall 106, a second sidewall 108 and an outer face 110 extending between the first and second sidewalls 106, 108. Each sidewall 106, 108 may generally extend perpendicularly from the outer face 110, with a transition edge 112, 114 being defined at each interface between the outer face 110 and the sidewalls 106, 108. For example, as shown in FIGS. 2 and 4, a first transition edge 112 may be defined between the outer face 110 and the first sidewall 106 while a second transition edge 114 may be defined between the outer face 110 and the second sidewall 108.

In several embodiments, each transition edge 112, 114 may correspond to a bend defined between the outer face 110 and one of the sidewalls 106, 108. For example, as shown in FIG. 6, the gusset 200 may be formed from a flat sheet or plate of material. In such an embodiment, the sidewalls 106, 108 may be bent relative to the outer face 110 at each transition edge 112, 114 (indicated by the dashed lines 116 shown in FIG. 6) in order to form the disclosed "U-shaped" gusset 100. In another embodiment, the gusset 100 may be a molded component, with the sidewalls 106, 108 being formed integrally with the outer face 110 at the transition edges 112, 114. Alternatively, the sidewalls 106, 108 may comprise separate components configured to be separately attached to the outer face 110 at the transition edges 112, 114 (e.g., by welding the sidewalls 106, 108 to the outer face 110).

Referring back to FIGS. 2-4, in several embodiments, each sidewall 106, 108 may include a first edge 118 and a second edge 120 configured to extend adjacent to the structural members 102, 104 forming the corner within which the gusset 100 is being installed. For example, as shown in the illustrated embodiment, the first edge 118 of each sidewall 106, 108 may be configured to extend adjacent to the first structural member 102 while the second edge 120 of each sidewall 106, 108 may be configured to extend adjacent to the second structural member 104. Additionally, to ensure that the gusset 100 may be seated flush against the structural members 102, 104, a corner angle 122 (FIG. 3) may be defined between the first and second edges 118, 120 that generally corresponds to the angle of the corner defined between the structural members 102, 104. For example, as shown in the illustrated embodiment, the structural members 102, 104 intersect at a 90 degree angle. As such, each sidewall 106, 108 may generally be configured to define a 90 degree corner angle 122 between its first and second edges 118, 120. Of course, in other embodiments, the corner angle 122 may be greater than 90 degrees or less than 90 degrees to match the angle of the corner defined between the structural members 102, 104.

It should be appreciated that the gusset 100 may be configured to be coupled to the structural members 102, 104 using any suitable attachment means and/or method known in the art. However, in several embodiments, gusset 100 may be welded in place. For example, in the illustrated embodiment, the sidewalls 106, 108 may be welded to the first structural member 102 along each first edge 118 and to the second structural member 104 along each second edge 120. In addition, portions of the outer face 11 may also be configured to be welded to the structural members 102, 104, such as by welding a lower edge 124 of the outer face 110 to the first structural member 102 and by welding an upper edge 126 of the outer face 110 to the second structural member 104.

It should also be appreciated that the structural members 102, 104 may generally have any suitable configuration known in the art. For example, in the illustrated embodiments, the structural members 102, 104 are configured as hollow, rectangular-shaped components. However, in other embodiments, the structural members 102, 104 may have a solid cross-section and/or may define any other suitable cross-sectional shape. Additionally, it should be appreciated that the structural members 102, 104 may generally be configured to form part of any suitable structural frame known in the art. For instance, as will be described below, the structural members 102, 104 may form part of a cab frame or any other suitable ROPS frame known in the art.

Referring still to FIGS. 2-4, the gusset 100 may also include an opening 128 defined at least partially by the outer face 110. As indicated above, such opening 128 may generally allow the gusset 100 to deform under increased loading conditions. Thus, unlike conventional gussets (e.g., the gusset 200 shown in FIG. 1), the disclosed gusset 100 may be capable of absorbing a significant amount of energy during a roll-over event, thereby reducing the amount of deformation occurring within other structural components of the frame or other structure within which the gusset 100 is installed.

In general, the opening 128 may have any suitable configuration that allows the gusset 100 to function as described herein. For example, as shown in the illustrated embodiment, the opening 128 is generally configured as an elongated slot extending lengthwise (indicated by the arrow 130 shown in FIG. 3) between a top edge 132 and a bottom edge 134 and crosswise (indicated by the arrow 136 shown in FIG. 4) between a first side edge 138 and a second side edge 140. However, in other embodiments, the opening 128 may define any other suitable shape and/or geometry that permits the gusset 100 to deform or otherwise absorb energy during a roll-over event. For example, instead of an elongated slot, the opening 128 may define a circular shape.

Additionally, as particularly shown in FIG. 3, the opening 128 may define a length 142 between its top and bottom edges 132, 134. In several embodiments, such length 142 may be greater than 50% of an overall length 144 of the outer face 110. For example, the opening 128 may be configured to extend lengthwise along a substantial portion of the outer face 110, such as by configuring the length 142 of the opening 128 to be greater than about 60% of the overall length 144 of the outer face 110 or greater than about 75% of the overall length 144. As such, only a small portion of the outer face 110 may extend lengthwise above and below the top and bottom edges 132, 134 of the opening 128. Alternatively, the length of the opening 142 may be significantly shorter, such as by configuring the length 142 to be less than 50% of the overall length 144 of the outer face 110.

Moreover, the opening 128 may also define a width 146 between its first and second side edges 138, 140. In several embodiments, the width 146 of the opening 128 may generally be equal to an overall width 148 of the gap defined between the first and second sidewalls 106, 108. For example, as shown in FIG. 4, the opening 128 extends cross-wise along the entire gap (i.e., along the entire outer face 110), thereby dividing the outer face 110 into two separate sections. However, in other embodiments, the width 146 of the opening 128 may be less than the overall width 146 of the gap defined between the first and second sidewalls 106, 108. In such embodiments, portions of the upper face 110 may extend between the transition edges 112, 114 and the first and second side edges 138, 140 of the opening 128.

Further, in several embodiments, at least a portion of the opening 128 may be defined by the first and second sidewalls 106, 108. For example, as shown in FIG. 3, portions of the opening 128 extend below a plane defined by the transition edges 112, 114 (e.g., indicated by the dashed line 154). In such an embodiment, at least a portion of the first side edge 138 may be defined by the first sidewall 106 and at least a portion of the second side edge 140 may be defined by the second sidewall 108.

Additionally, the first and second side edges 138, 140 may generally be configured to define any suitable shape or profile between the top and bottom edges 132, 134 of the opening 128. For example, as shown in FIG. 2, the first and second side edges 138, 140 each define an arced or curved profile between the top and bottom edges 132, 134. Alternatively, the side edges 138, 140 may be configured to define a straight profile or any other suitable profile between the top and bottom edges 132, 134 of the opening 128.

It should be appreciated that, by carefully selecting the dimensions and/or geometry of the opening 128 (e.g., based on the material properties of the gusset 100), the disclosed gusset 100 may provide significant advantages over conventional gussets during the occurrence of a roll-over event. Specifically, the opening 128 may be configured such that one or both of the sidewalls 106, 108 deform inwardly or outwardly relative to the outer face 110, thereby providing for a controlled yielding of the gusset 100 at the increased loads associated with the roll-over event.

For instance, FIG. 5 illustrates one example of how the disclosed gusset 100 may deform in response to increased loading conditions. As indicated above, a large reactive load may be transmitted through a work vehicle's structural components during a roll-over event. As shown in FIG. 5, as this reactive load is transmitted through the gusset 100, the sidewalls 106, 108 may deform significantly relative to the outer face 110. Specifically, in the illustrated embodiment, the sidewalls 106, 108 have deformed inwardly in response to the reactive load, thereby reducing the width 146 of the opening 128 at the location of the deformations. However, depending on how the load is transmitted through the gusset 100, the sidewalls 106, 108 may, in fact, deform outwardly in response to the reactive load, which may result in a local increase in the width 146 of the opening 128.

Referring now to FIGS. 7 and 8, respective perspective views of one embodiment of a work vehicle 10 and a cab frame 18 suitable for use with the work vehicle 10 is illustrated in accordance with aspects of the present subject matter. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As particularly shown in FIG. 7, the work vehicle 10 includes a pair of front tracks 12, a pair or rear tracks 14 and a chassis 16 coupled to and supported by the tracks 12, 14. As is generally understood, the work vehicle 10 may also include an engine and a transmission (not shown) supported by the chassis 16, which may be used to rotationally drive the front tracks 12 and/or the rear tracks 14. Additionally, a cab frame 18 (FIG. 8) may form the support structure for an operators cab 20, which may house various control devices (not shown) for permitting an operator to control the operation of the work vehicle 10. The cab frame 18 may generally be supported by a portion of the chassis 16. For example, as indicated above, the cab frame 18 may be configured to be mounted on the chassis 16 via a suitable suspension system (not shown) forming part of the work vehicle's ROPS.

It should be appreciated that, in alternative embodiments, the work vehicle 10 may have any other suitable configuration known in the art. For example, the work vehicle 10 may include tires in lieu of tracks 12, 14 or may include a combination of tires and tracks.

As particularly shown in FIG. 8, the cab frame 18, itself, includes a plurality of structural members 22, 24 configured to be coupled together to form a structural frame. For example, the cab frame 18 may include a plurality of primary structural members 20 generally configured to form the base shape or structure of the frame 18 (e.g., a generally rectangular or box shape), such as by including four vertically extending structural members 22 coupled together with four horizontally extending structural members 22 at both the top and bottom of the frame 18. In addition, the cab frame 18 may include a plurality of secondary structural members 24 coupled between the primary structural members 22 to add stiffness and rigidity to the frame 18.

Moreover, the cab frame 18 may also include one or more of the disclosed gussets 100 installed at one or more of the corners defined between its adjacent structural members 22, 24. For example, as shown in FIG. 8, the gussets 100 are installed between adjacent primary structural members 22, namely at the corners located at the rear bottom, rear top and front top of the cab frame 18. However, it should be appreciated that the gussets 100 may generally be installed at any corner of the cab frame 118 (e.g., including at corners defined between primary structural members 22, between secondary structural members 24 and/or between a primary structural member 22 and a secondary structural member 24).

Additionally, it should be appreciated that the configuration of the cab frame 18 described above and shown in FIG. 8 is provided only to place the present subject matter in an exemplary field of use. Thus, one of ordinary skill in the art should readily understand that the disclosed gussets 100 may be utilized with any manner of cab frame configuration to add stiffness and rigidity to the frame at lower loads while still allowing energy to be absorbed at increased loading conditions.

It should also be appreciated that the use of the disclosed gussets 100 need not be limited to cab frames. Rather, the gussets 100 may generally be installed between any adjacent structural members forming part of any suitable structural frame. For example, as shown in FIG. 3, the first and second structural members 102, 104, together with the gusset 100, may generally form a corner assembly 180. Such corner assembly 180 may generally be configured to form part of any suitable structural frame, including various ROPS frames used within work vehicles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gusset for use within a roll-over protection system of a work vehicle, the gusset comprising:
a first sidewall;
a second sidewall spaced apart from the first sidewall; and
an outer face extending crosswise between the first and second sidewalls and extending lengthwise between an upper edge and a lower edge, the outer face at least partially defining an opening extending lengthwise between a top edge and a bottom edge, the top edge being spaced apart from the upper edge such that the outer face includes in upper portion extending between the opening and the upper edge, the bottom edge being spaced apart from the lowed edge such that the outer face includes a lower portion extending between the opening and the lower edge, the upper and lower portions of the outer face defining planar surfaces,
wherein the opening is configured such that at least one of the first sidewall or the second side wall deforms relative to the outer face when the work vehicle experiences a roll-over event,
wherein the planar surfaces of the upper and lower portions of the outer face are substantially aligned with a common plane extending lengthwise along the outer face.

2. The gusset of claim 1, wherein the opening extends cross-wise between a first side edge and a second side edge.

3. The gusset of claim 1, wherein the opening defines a length between the top and bottom edges, the length being greater than 50% of an overall length of the outer face defined between the upper and lower edges.

4. The gusset of claim 2, wherein the opening defines a width between the first and second side edges, the width being substantially equal to a width defined between the first and second sidewalls.

5. The gusset of claim 2, wherein the first and second side edges define a curved profile between the top and bottom edges.

6. The gusset of claim 2, wherein at least a portion of the first side edge is defined by the first sidewall and at least a portion of the second side edge is defined by the second sidewall.

7. A structural frame for a work vehicle, the frame comprising:
a plurality of structural members coupled together, the plurality of structural members including a first structural member and a second structural member coupled to the first structural member such that a corner is defined between the first and second structural members; and
a gusset coupled between the first and second structural members at the corner, the gusset comprising:
a first sidewall including a first edge and a second edge;
a second sidewall spaced apart from the first sidewall and including a first edge and a second edge, the first edge of the first and second sidewalk being configured to extend adjacent to the first structural member, the second edge of the first and second sidewalk being configured to extend adjacent to the second structural member; and
an outer face extending crosswise between the first and second sidewalls and extending lengthwise between an upper edge disposed adjacent to the first structural member and a lower edge disposed adjacent in the second structural member, the outer face at least partially defining an opening extending lengthwise between a top edge and a bottom edge, the top edge being spaced apart from the upper edge such that the outer face includes an upper portion extending between the opening and the first structural member, the bottom edge being spaced apart from the lower edge such that the outer face includes a lower portion extending between the opening and the second structural member, the upper and lower portions of the outer face defining planar surfaces,
wherein the opening is configured such that at least one of the first sidewall or the second sidewall deforms relative to the outer face when the work vehicle experiences a roll-over event,
wherein the planar surfaces of the upper and lower portions of the outer face are substantially aligned with a common plane extending lengthwise along the outer face.

8. The frame of claim 7, wherein the opening extends cross-wise between a first side edge and a second side edge.

9. The frame of claim 7, wherein the opening defines a length between the top and bottom edges, the length being greater than 50% of an overall length of the outer face defined between the upper and lower edges.

10. The frame of claim 8, wherein the opening defines a width between the first and second side edges, the width being substantially equal to a width defined between the first and second sidewalls.

11. The frame of claim 8, wherein the first and second side edges define a curved profile between the top and bottom edges.

12. The frame of claim 8, wherein at least a portion of the first side edge is defined by the first sidewall and at least a portion of the second side edge is defined by the second sidewall.

13. The frame of claim 7, wherein the frame comprises a cab frame of the work vehicle.

14. A corner assembly for a structural frame, the corner assembly comprising:
   a first structural member;
   a second structural member coupled to the first structural member such that a corner is defined between the first and second structural members; and
   a gusset coupled between the first and second structural members at the corner, the gusset including:
      a first sidewall including a first edge and a second edge;
      a second sidewall spaced apart from the first sidewall and including a first edge and a second edge, the first edge of the first and second sidewalls being configured to extend adjacent to the first structural member, the second edge of the first and second sidewalk being configured to extend adjacent to the second structural member; and
      an outer face extending crosswise between the first and second sidewalls and extending lengthwise between an upper edge disposed adjacent to the first structural member and a lower edge disposed adjacent to the second structural member, the outer face at least partially defining an opening extending lengthwise between a top edge and a bottom edge, the top edge being spaced apart from the upper edge such that the outer face includes an upper portion extending between the opening and the first structural member, the bottom edge being spaced apart from the lower edge such that the outer face includes a lower portion extending between the opening and the second structural member, the upper and lower portions of the outer face defining planar surfaces,
   wherein the planar surfaces of the upper and lower portions of the outer face are substantially aligned with a common plane extending lengthwise along the outer surface.

15. The corner assembly of claim 14, wherein the opening extends cross-wise between a first side edge and a second side edge.

16. The corner assembly of claim 14, wherein the opening defines a length between the top and bottom edges, the length being greater than 50% of an overall length of the outer face defined between the upper and lower edges.

17. The corner assembly of claim 15, wherein the opening defines a width between the first and second side edges, the width being substantially equal to a width defined between the first and second sidewalls.

18. The corner assembly of claim 15, wherein the first and second side edges define a curved profile between the top and bottom edges.

19. The corner assembly of claim 15, wherein at least a portion of the first side edge is defined by the first sidewall and at least a portion of the second side edge is defined by the second sidewall.

* * * * *